US010957016B2

(12) United States Patent
Valdaitsev et al.

(10) Patent No.: US 10,957,016 B2
(45) Date of Patent: Mar. 23, 2021

(54) IMAGE PROCESSING APPARATUS AND METHOD FOR IMAGE PROCESSING, IN PARTICULAR FOR A SUPER-RESOLUTION MICROSCOPE

(71) Applicant: SURFACE CONCEPT GmbH, Mainz (DE)

(72) Inventors: Dmitry Valdaitsev, Mainz (DE); Andreas Oelsner, Wiesbaden (DE)

(73) Assignee: SURFACE CONCEPT GmbH, Mainz (DE)

( * ) Notice: Subject to any disclaimer, the term of this patent is extended or adjusted under 35 U.S.C. 154(b) by 95 days.

(21) Appl. No.: 16/440,506

(22) Filed: Jun. 13, 2019

(65) Prior Publication Data
US 2019/0385278 A1    Dec. 19, 2019

(30) Foreign Application Priority Data

Jun. 13, 2018   (DE) .......................... 102018114090.8

(51) Int. Cl.
*G06T 3/40* (2006.01)
*G02B 21/36* (2006.01)
*G06T 1/60* (2006.01)

(52) U.S. Cl.
CPC .......... *G06T 3/4069* (2013.01); *G02B 21/365* (2013.01); *G06T 1/60* (2013.01)

(58) Field of Classification Search
None
See application file for complete search history.

(56) References Cited

U.S. PATENT DOCUMENTS

| 2006/0017744 | A1* | 1/2006 | Yamada | G09G 3/2059 345/596 |
| 2012/0147172 | A1* | 6/2012 | Okamoto | G06T 7/33 348/79 |
| 2018/0005080 | A1* | 1/2018 | Sugimura | G06K 9/6212 |
| 2019/0276881 | A1* | 9/2019 | Zhuang | G01N 1/36 |
| 2019/0331907 | A1* | 10/2019 | Franke | G02B 21/008 |
| 2019/0333199 | A1* | 10/2019 | Ozcan | G06N 3/0481 |

FOREIGN PATENT DOCUMENTS

| EP | 2752699 A1 | 7/2014 |
| WO | 2018/091704 A1 | 5/2018 |

OTHER PUBLICATIONS

Ricardo Henriques et al., "QuickPALM: 3D real-time photoactivation nanoscopy image processing in ImageJ", "Nature Methods", May 1, 2010, DOI:10.1038/nmeth0510-339, pp. 339-340, vol. 7 No. 5.

Mark Bates et al., "Stochastic Optical Reconstruction Microscopy (STORM): A Method for Superresolution Fluorescence Imaging", Publisher: Cold Spring Harbor Laboratory Press, dated 2013, doi:10.1101/pdb.top075143, pp. 498-520, Mar 6, 2016.

(Continued)

*Primary Examiner* — Fayyaz Alam
(74) *Attorney, Agent, or Firm* — Kaplan Breyer Schwarz, LLP

(57) ABSTRACT

An image processing apparatus and an image processing method practicable with the apparatus for extracting coordinates of brightness maxima from image data. The apparatus and method are particularly suitable for processing image data of a super-resolution localization microscope.

16 Claims, 5 Drawing Sheets

(56) References Cited

OTHER PUBLICATIONS

D. K. Naidu et al., "A Comparative Analysis of Algorithms for Determining the Peak Position of a Stripe to Sub-pixel Accuracy", BMVC dated 1991, doi:10.5244/C.5.28, pp. 217-225.
Alex Small et al., "Fluorophore localization algorithms for super-resolution microscopy", "Nature Methods", Feb. 27, 2014, DOI:10.1038/NMETH.2844, pp. 267-269, vol. 11 No. 3.
"Lookup Table", "Wikipedia", Apr. 20, 2018, 10 pp., https://de.wikipedia.org/w/index.php?title=Lookup-Tabelle&oldid=176713409.
Office Action issued in counterpart German patent application No. 102018114090.8, dated Apr. 12, 2019, 20 pp.
Danzl et al., "Coordinate-targeted fluorescence nanoscopy with multiple off states", Jan. 18, 2016, Nature Photonics, p. 122-129, vol. 10.

\* cited by examiner

IMAGE PROCESSING APPARATUS AND METHOD FOR IMAGE PROCESSING, IN PARTICULAR FOR A SUPER-RESOLUTION MICROSCOPE

RELATED APPLICATIONS

This application claims the priority benefit of German patent application number 102018114090.8, the entire disclosure of which is incorporated herein by reference.

FIELD

The invention generally relates to methods and apparatus for image processing. More particularly, the invention relates to an image processing apparatus and an image processing method practicable with the apparatus for extracting coordinates of brightness maxima from image data. The invention is particularly suitable for processing image data of a super-resolution localization microscope.

BACKGROUND

By super-resolution microscopy, those skilled in the art will generally understand light microscopic methods and apparatus that provide image information at resolutions below the Abbe's diffraction limit. A number of different principles for super-resolution microscopy are known, which are based inter alia on detecting sufficiently spatially isolated light emitters whose size is well below the diffraction limit of the optical system. In this way, the light emitters of the sample to be examined can be located with a higher accuracy than the optical system itself permits.

Methods of the principle of localization microscopy are referred to as STORM, dSTORM, PALM and SPDM (Spectral Precision Distance Microscopy). In these methods, the fluorescence of selectively excited or radiating, sufficiently distant emitters is evaluated. The emitters can be exactly spatially localized, since the maximum of the optical signal propagated by the point spreading function of the microscope can still be determined precisely.

Although the various super-resolution microscopy methods now reach very high spatial resolution, their practical use, for example in the field of histological studies, is still very limited.

The current realization of super-resolution localization microscopy involves the transmission of very large amounts of data from the camera to the evaluation computer. These amount to over 100 gigabytes of data needed to reconstruct a single super-resolution image. Even if a preprocessing of the data takes place with the determination of image sections to be evaluated (so-called "regions of interest", ROI), it still results in very large amounts of data of several 100 megabytes per image. This data must be stored as well as processed. Often it can only be decided after completion of an experiment, if this procedure was successful. However, as a rule, due to the localized fluorescence signals and the structure of the sample, only a purely stochastically distributed fraction of less than 10% of the pixels present on the camera is used in the acquisition of the data. For this reason, the vast majority of the transmitted and stored data is without information content, but leads to the occupancy of large storage capacities and makes use of a large part of the computing capacity during transfer and processing. Not only the storage requirement is a problem here. Rather, the large amounts of data prevent rapid processing of the data including its representations. This results in the fact that in super-resolution localization microscopy an image of the sample is available only after a long time.

SUMMARY

The invention is therefore generally based on the object to accelerate the evaluation of the image data. This object is achieved by the subject matter of the independent claims. Advantageous embodiments and further developments of the invention are specified in the dependent claims.

Accordingly, the invention provides an image processing apparatus, in particular, for the image data of a super-resolution localization microscope having a processing unit for processing the image data, which is adapted to determine coordinates of the maxima of brightness distributions in the image data with an accuracy higher than the pixel pitch, wherein the computing means is adapted to determine in the image data brightness maxima from the increase of the brightness values of pixels relative to adjacent pixels, and wherein the image processing apparatus is further adapted to determine the coordinates of a brightness maximum by forming differences of brightness values of adjacent pixels and concatenating these differences in sorted order according to the spatial sequence of the pixels, wherein the computing means further comprises a memory with a table stored therein with coordinate values, wherein the computing means is set up to read out a coordinate value from the table on the basis of an address determined by the concatenated difference values.

In other words, the concatenated or linked differences form an address, wherein the table assigns the addresses to particular coordinates. This assignment can be calculated using a suitable model. For example, a Gaussian distribution of brightness at a maximum results in a certain pattern of differences that is different than, for example, a Lorenz-shaped distribution. The table can be calculated and saved in advance. Thus, the particularly complex calculations are performed before the measurement. The otherwise arising determination of the coordinates of the brightness maxima by adaptation of the respective model of the brightness distribution is replaced by very simple arithmetic operations, namely forming the difference, concatenating the difference values to addresses and reading out the coordinates determined by the addresses at the position or the storage position of the table.

In general, it makes sense to carry out such a determination for two different spatial directions, that is about the x- and y-direction. Accordingly, a two-dimensional table is stored for this purpose. In a preferred embodiment of the invention, the memory thus contains a two-dimensional table, wherein the image processing apparatus is adapted to form differences of brightness values along two different directions, to concatenate the differences to an address for each direction and to read out the coordinates of the spatial directions from the table at the position determined through the two addresses.

The invention is generally suitable for precisely determining the position of punctiform brightness maxima from image data which have blurring due to a diffraction limit or generally optical aberrations. As mentioned above, this can be used with particular advantage in the processing of image data from super-resolution localization microscopes. According to one aspect, the invention therefore also provides a super-resolution microscope which comprises—an excitation source for exciting fluorescent light in a sample to be examined by a microscope and placed in front of an objective of the microscope, a camera having an optoelectronic sensor for recording the microscopic image of the light emitted by fluorescence excitation of the sample, and an image processing apparatus according to the invention, which is connected to the sensor to process image data read from the sensor and to determine the coordinates of brightness maxima.

The image processing apparatus according to the invention may be at least partially implemented in a microcontroller. This is possible because the invention performs the image processing for converting the image data into data containing the coordinates of brightness maxima in super-resolution with very simple calculations. Accordingly, it is provided in a development of the invention that the image processing apparatus comprises evaluation electronics with at least one microcontroller, which is set up to perform at least the calculation of the differences of brightness values of adjacent pixels.

In order to reduce the amount of data to be transmitted, it is provided in a particularly preferred development of the invention that the evaluation electronics are integrated in a camera. In this way, the data stream from the camera to a computer for further processing of the data can be significantly reduced. According to this embodiment of the invention, it is thus provided that the image processing apparatus comprises a computer in addition to the evaluation electronics and that the evaluation electronics is integrated in a camera which is connected to the computer for transmitting the data of the evaluation electronics.

The method for image processing with an image processing apparatus according to the invention, in particular for the image data of a super-resolution microscope, is based on reading out image data from at least one optoelectronic sensor and determining coordinates of the maxima of brightness distributions in the image data with a computer for processing the image data, wherein the computer identifies brightness maxima in the image data by the increase of the brightness values of pixels relative to adjacent pixels and then determines the coordinates of a brightness maximum by forming differences of brightness values of adjacent pixels and concatenating these differences in sorted order according to the spatial sequence of the pixels, wherein the computing means further stores a table of coordinate values in a memory and reads out a coordinate value from the table using an address determined by the concatenated difference values.

According to yet another aspect of the invention, a camera and an image processing apparatus with a camera and a computer connected to the camera for a super-resolution microscope are provided, which are provided with appropriate means for carrying out the method according to the invention, or equipped with evaluation electronics for use in a super-resolution microscope according to the invention.

The camera of a super-resolution microscope according to this embodiment of the invention is therefore set up to evaluate the image data in such a way that the evaluated data contains the locations of the fluorescence emitters of the examined sample localized in high resolution. The data thus generated contains the essential image information in compressed form. Due to the internal evaluation in the camera with the microcontroller, a high computing speed can be achieved, which enables the determination of the fluorescence emitter in super-resolution during operation.

The invention will be explained in more detail below and with reference to the accompanying figures.

BRIEF DESCRIPTION OF THE DRAWINGS

The invention will be explained in more detail below with reference to the accompanying drawings. Here, the same reference numerals in the drawings refer to the same or corresponding elements. In the figures.

DETAILED DESCRIPTION

Figure 1:
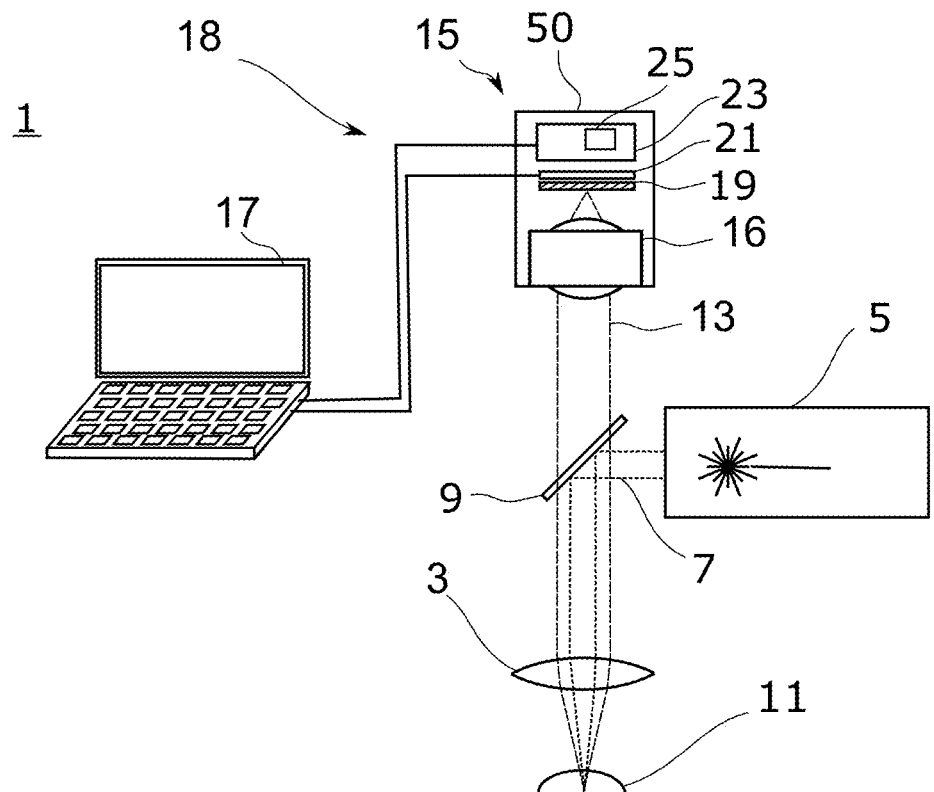
FIG. 1 shows a schematic structure of a super-resolution light microscope with an image processing apparatus according to the invention.

FIG. 1 shows an embodiment of a super-resolution light microscope 1 with an image processing apparatus according to the invention in a schematic representation. In particular, a microscope operating on the principle of localization microscopy is provided for the invention. As a source of excitation for excitation of fluorescence, a laser 5 is generally suitable, as in the illustrated example. It is also generally conceivable to use a plurality of lasers or laser beams, for example to irradiate light of different wavelengths onto the sample 11 simultaneously or else in a sequential sequence. The sample 11 is arranged for examination in front of the objective 3 of the microscope 1. Without being limited to the illustrated example, a dichroic mirror 9 may be provided to couple the laser beam 7 into the beam path of the microscope or, more generally, to spatially separate fluorescent light and laser light in the beam path of the microscope. The objective 3 of the microscope 1 generates an enlarged or microscopic image of the fluorescent light 13 emitted by the sample 11, which is recorded by the optoelectronic sensor 19 of the camera 15. In the illustrated embodiment, the camera 15 has its own additional lens 16. However, this is not mandatory. The objective 3 of the microscope 1 can also image the sample 11 directly on the sensor 19.

A computer 17 for evaluating and/or displaying image data of the camera 15 is connected to the camera 15. But a data evaluation is also already performed by the camera 15 itself according to the invention. In addition to the read-out electronics 21 of the camera 15, which preferably comprises an analog-to-digital converter for converting the sensor 19 signals into bit values, or more generally into digital data, the camera 15 also has evaluation electronics 23 for this purpose. This evaluation electronics 23 includes one or more microcontrollers 25. This controls the reading of the image data from the readout electronics 21 and calculates exact location coordinates of the brightness maxima. These brightness maxima generally result from localized fluorescence emitters, which in super-resolution microscopy in particular can also be individual fluorescent molecules. Their size is therefore typically far below the optical resolution of the microscope. On the sensor, a brightness distribution distributed over several pixels arises from the original, substantially point-shaped signal emitted by the sample, then determined by the point spread function of the microscope. The evaluation device is now set up in particular by means of the microcontroller 25, which has been set up in accordance with the program, to calculate the brightness values read out of several pixels with one another in order to determine the location coordinates of the brightness maxima as the result. This determination can be more accurate when taking into account the brightness, or color values of several pixels, than the pixel pitch or pitch. These location coordinates are then provided as data for transmission to the computer 17. Camera 15 and computer 17 form an image processing apparatus 18 according to the invention. The camera 15 is generally preferably formed as a unit. In this case, the sensor 16, the read-out device 21 and the evaluation device 23 are combined with the microcontroller 25 in a device unit, for example, these can be arranged in a common housing 50 of the camera 15.

In general, FPGA ("field programmable gate array") is preferred as the microcontroller for a camera of a super-resolution microscope. An FPGA can be flexibly set up in terms of programming in order to process individual routines for determining the location coordinates of the brightness maximums.

The invention is also distinguished by two essential functional aspects. On the one hand, the very flexible and extremely fast hardware-related data processing on the microcontroller, such as an FPGA, can enable a real-time analysis of the gigantic amounts of data resulting from these methods. The technology currently available provides 10,000 megapixel processing capacity at 1 MHz line rate and/or frame rate greater than 1000/s and/or at least 1 Gbit/s data transfer. Due to the implementation of the algorithms on the microcontroller in the camera 15, maximum flexibility is obtained to realize an incremental optimization of the algorithms in the hardware at a later time.

Secondly, the concept of hit identification and the targeted cutting out of the raw data, a massive reduction in memory requirements achieved without suffering a loss of data. This approach is gaining tremendously in importance against the background of super resolution microscopy, in which gigantic amounts of data are generated. Furthermore, a reduction of the computer load in the post-processing of the data is achieved by the data reduction, whereby a real-time post-processing of the data is made possible on the computer 17.

Figure 2:
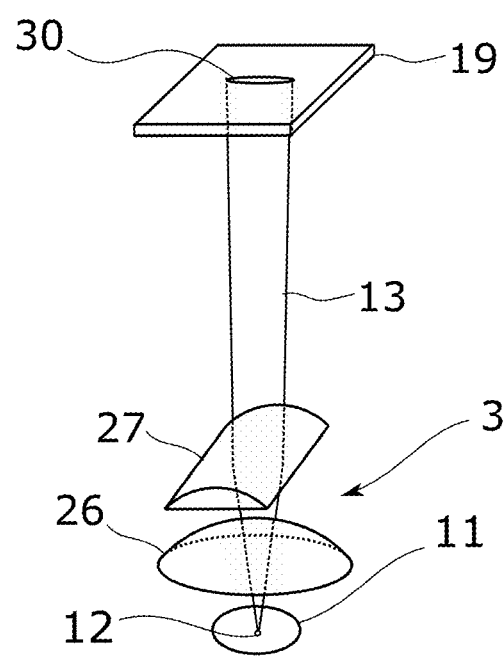
FIG. 2 shows a development of a super-resolution light microscope with a cylindrical lens.

The fluorescence signal of localized fluorescence emitters, such as single molecules, can not only be located laterally. An axial localization is also possible if a cylindrical lens is installed in the beam path of the microscope. This results in the ideally radially symmetric imaging function being elliptically distorted as a function of whether the molecule to be located is above or below the focal plane defined by the objective. FIG. 2 shows schematically a corresponding optical arrangement. Here, the objective 3 comprises, in addition to one or more radially symmetrically focusing optical elements 26, a cylindrical lens 27. The cylindrical lens 27 causes an astigmatic distortion of the image of the fluorescence emitter 12. The figure presents itself as a brightness distribution 30 on the optoelectronic sensor 19. The axial coordinate of the fluorescence emitter 30 corresponds to the asymmetry of the brightness distribution. It is generally not significant how the astigmatism of the optical system is evoked. Therefore, in generalization of a cylindrical lens, at least one astigmatically distorting optical element can be provided. In a further development of the invention, it is accordingly provided that the brightness distribution on the sensor 19 is deformed by means of at least one astigmatically acting optical element in the beam path of the microscope 1 in the sensor plane, wherein the image processing apparatus 18 is formed to determine the spatial coordinate of the fluorescence emitter 12 in the axial direction of the microscope 1, or in the direction along the optical axis of the microscope 1, from the deformation of the brightness distribution, again with computation of the brightness values of several pixels.

Figure 3:
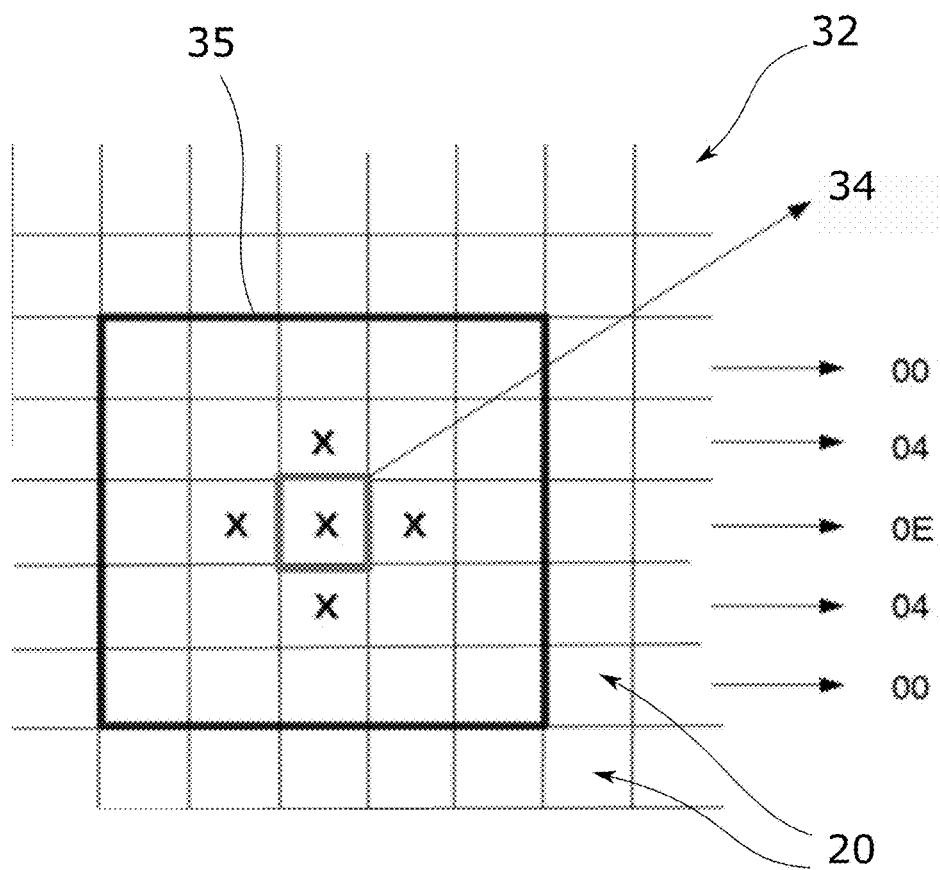
FIGS. 3 and 4 show sections of a matrix of brightness values.

According to a preferred embodiment of the invention, the image processing includes a smoothing of the brightness values. Accordingly, the image processing apparatus, preferably the microcontroller, is set up to compute the brightness values of a plurality of adjacent pixels with one another in such a way that a smoothed brightness value is obtained for one pixel. The smoothed brightness values can then be temporarily stored for further processing. As an exemplary embodiment, FIG. 3 shows a detail of a matrix 32 of the brightness values. Each matrix entry represents one pixel 20 of the sensor.

Around a relevant pixel 34, according to an embodiment of the invention, a region 35 is formed with a plurality of pixels, which preferably also contains the relevant pixel. In the illustrated example, the area is a 5×5 submatrix, in the center of which lies the relevant pixel 34, i.e. the pixel for which a smoothed brightness value is to be calculated. Without being limited to a specific shape and/or size of the area, according to an advantageous embodiment of the invention, the calculation of the smoothed brightness value of the relevant pixel may comprise the addition of the brightness values of the pixels of the area by means of the microcontroller. The added value is proportional to an average of the brightness. It is therefore not absolutely necessary to actually calculate the average. In order to avoid an overflow or a saturation in the number format used, however, a bit shift operation can be performed in the microcontroller. Such an operation can be performed with faster orders of magnitude compared to a division. This applies in particular to an implementation of the image processing in a microcontroller. According to a development of the invention, therefore, the image processing apparatus, preferably the microcontroller, is set up to perform at least one bit shift operation when adding the brightness values of several pixels. Since the difference calculation is preferably carried out by the microcontroller, it is expedient to perform the upstream smoothing with the microcontroller in this case.

Figure 4:
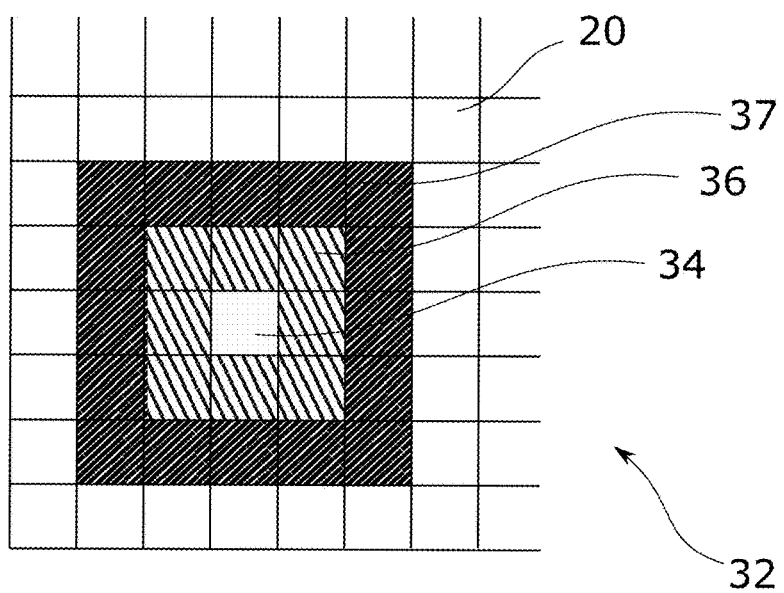

Of course, for a variety of reasons, the image data also exhibits brightness variations that are not due to the fluorescence of emitters in the sample. In order to achieve an effective reduction of the image data with the most reliable extraction of actual fluorescence events, it is provided in a further development of the invention that the image processing apparatus, preferably already the microcontroller is set up to check the image data for fluorescence events. The check is preferably performed on the smoothed image data. In order to check whether a fluorescence event occurs at a pixel, the image processing apparatus is set up to compare the brightness value of the observed pixel with brightness values of a plurality of further pixels in the vicinity of the observed pixel and then to determine the position of a fluorescence emitter if the brightness value of the observed pixel is higher by a first predetermined amount than the brightness values of a first group of further pixels within the vicinity of the observed pixel and if the brightness values of the first group of further pixels is higher by a second predetermined amount than the brightness values of a second group of pixels, wherein the pixels are selected such that the pixels of the first group are located closer to the observed pixel than the pixels of the second group. A particularly certain detection results when the pixels of the groups are arranged in a ring around the observed pixel. As an example, FIG. 4 again shows a section of a matrix 32 of the brightness values. Each matrix entry, as in FIG. 3, represents a pixel 20 of the sensor.

It should be determined for the relevant pixel 34 whether there is a fluorescence event in the latter, i.e. whether a fluorescence emitter lies within the region of the sample imaged by this pixel 34. For this purpose, the brightnesses of a first group 36 and a second group 37 of pixels are compared with the brightness value of the observed or relevant pixel 34. According to one embodiment of the invention, as in the illustrated example, the pixels 20 of the first group are direct neighbors of the observed pixel 34. Furthermore, according to a further development of this embodiment, the pixels 20 of the second group 37 may be direct neighbors of the pixels 20 of the first group 36. Unlike in the representation of FIG. 4, it is not absolutely necessary to calculate the brightness values of all the further pixels of the first and second groups 36, 37 arranged annularly around the relevant pixel. For example, the pixels arranged at the four corners of the square ring of the second group could also be omitted.

At least for the relevant pixel 34, the smoothed brightness value is preferably used. Since the calculation of the brightness values of the pixels of the first and second group 36, 37 brings about an averaging, it is also possible here for the brightness values to use the non-smoothed values read out from the optoelectronic sensor 19.

The above-explained filtering method for discriminating fluorescence events proceeds according to an embodiment as follows: A fluorescence event is detected by the image processing apparatus, in particular by the microcontroller, or assigned to an observed pixel 34 if the brightness distribution around the observed pixel 34 satisfies the following conditions:

a) the brightness value of the observed pixel 34 exceeds the average brightness value (average intensity) of the adjacent pixels (i.e. the pixels of group 36) by a predetermined brightness value "BlobDifMinTop", so that the following applies:

$$\text{int(center pixel)} > \text{average int(inner ring)} + \text{BlobDifMinTop}$$

The value of BlobDifMinTop can be set or adjusted by the user since the shape and intensity of the brightness distribution of an event may depend on the experimental conditions, such as the sample or the fluorescent dyes employed.

b) furthermore, the microcontroller checks whether the mean brightness value of the inner ring, that is to say the pixels of the first group 36, exceeds the mean brightness value of the outer ring of the adjacent pixels of the second group 37 by a predetermined value "BlobDifMinBottom":

$$\text{average int(inner ring)} > \text{average int(outer ring)} + \text{BlobDifMinBottom}$$

The value BlobDifMinBottom as well as the value BlobDifMinTop can be determined or adjusted by the user.

If an event, i.e. a fluorescence emission, has been detected, then a determination of the location coordinates of the event can take place.

The analysis of the image data in the camera 15 by means of the microcontroller for determining the location coordinates of a fluorescence event is described below. The analysis is based on determining the coordinates of a brightness maximum by forming these differences of brightness values of adjacent pixels and concatenating these differences in sorted order according to the spatial sequence of the pixels, the computing means further comprising a memory having a table of coordinate values stored therein, wherein the computing means is arranged to read out a coordinate value from the table based on an address determined by the concatenated difference values.

According to one embodiment of the invention, the microcontroller is set up to compare a brightness distribution given by the brightness values of several pixels with the entries in the table (hereinafter also referred to as lookup table or translation table), wherein the entries of the lookup table represent an allocation of brightness distributions to location coordinates, wherein the microcontroller is further set up to best match a brightness distribution of an entry in the lookup table with the brightness distribution of the multiple pixels to associate the location coordinate of the table entry with a fluorescence event. It is also possible for the readout of the coordinate values from the table to take place in a computer 17 separate from the evaluation electronics 23. In this case, the difference values calculated by the evaluation electronics or addresses already formed by concatenation from the difference values can be transmitted to the computer 17.

According to the preferred embodiment of the invention, the difference values are calculated by the microcontroller and transmitted to the computer 17.

This assignment can be done in particular by the location coordinate being recorded in a data record describing the fluorescence event. The location coordinate can also be represented by an index. In this case, the location coordinates in the lookup table can also simply be given and readable by the order of the data records.

The selection of the pixels furthermore takes place, in particular, depending on the fact that a fluorescence event has been assigned to a pixel or a region of pixels, i.e. that a fluorescence event lies in the region of the specimen 11 imaged by the pixel or region under consideration.

Figure 5:
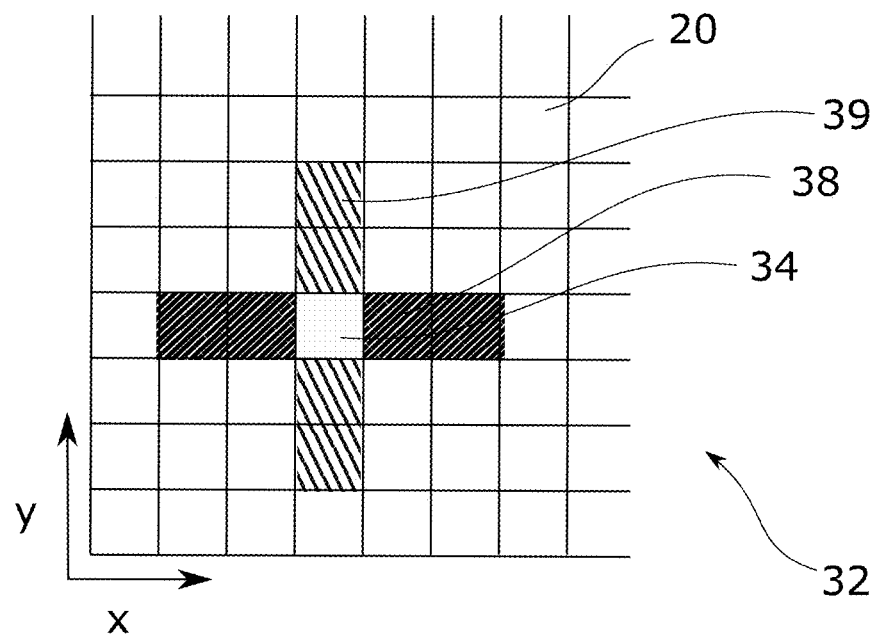
FIG. 5 shows a matrix of brightness values with two rows of pixels for determining location coordinates of fluorescence events.

An exemplary embodiment of the extraction of location coordinates by means of a look-up table will be described with reference to FIGS. 5 and 6. The observed pixel 34, or the region of the sample imaged therefrom, has previously been assigned a fluorescence event, wherein the assignment may have been made by the microcontroller 25 as described with reference to FIG. 4.

In order to determine at least one location coordinate with high resolution, pixels 20 are generally selected whose brightnesses represent a brightness distribution. The maximum of the brightness distribution indicates the sought-for location coordinate. Typically, the location of the fluorescent event in two directions should be determined with high accuracy. To this end, as shown in FIG. 5, two sets of pixels 20 are selected, namely a row 38 of pixels in a first direction (x-direction) and another row of pixels in a non-parallel, preferably perpendicular direction (y-direction). It is favorable if the quantities also contain the relevant pixel 34, as in the example shown.

Figure 6:
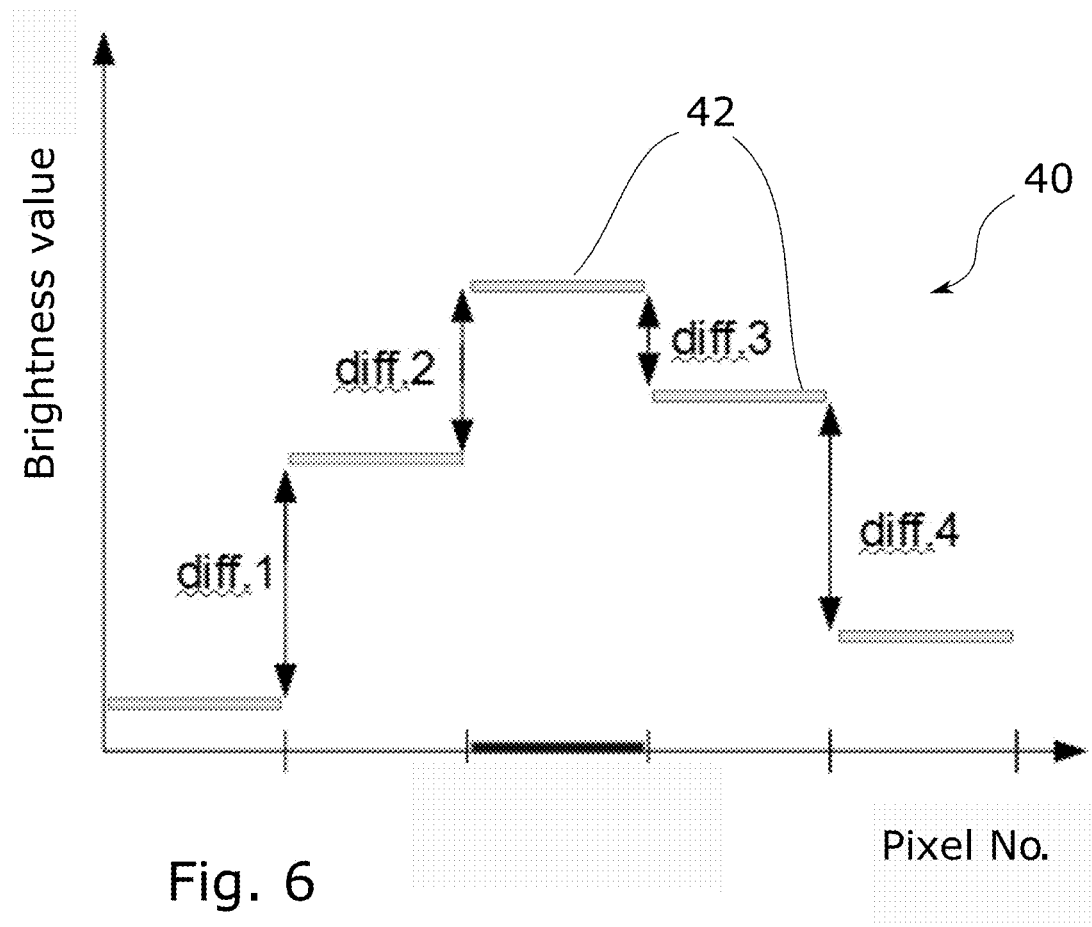
FIG. 6 shows a brightness distribution represented by the brightness values of the pixels of a row.

FIG. 6 shows the brightness distribution 40 represented by the brightness values 42 of the pixels of a row, for example the row 38 in the x-direction. The maximum brightness value 42 is the brightness value of the observed pixel 34 in accordance with the previously performed event detection according to FIG. 4.

In general, without being limited to the illustrated example, it is favorable according to a development of the invention if the differences in the brightness values 42 are considered. The differences in the brightness values 42 are denoted by diff.1, diff.2, diff.3 and diff.4 in FIG. 6. These differences are then compared by the image processing apparatus with the entries of the lookup table.

The table is arranged so that a coordinate value can be found at the table position that corresponds to the difference values concatenated to an address. If, for example, the x-values were arranged in columns and the y-values in rows in the table, and if the difference values diff.1, diff.2, diff.3 and diff.4 were determined in the x-direction, then in one example the corresponding x-coordinate would be at the column with the number that corresponds to the concatenated values diff.1|diff.2|diff.3|diff.4. The reading out of table entries is a procedure which can be carried out very quickly by a computer, just as the simple difference formation. Therefore, not only the data amount to be transmitted can be considerably reduced with the invention, but also the processing can be considerably accelerated. Effective processing is thus achieved, in particular, if evaluation electronics are provided with a microcontroller which carries out the steps of smoothing, the detection of fluorescence events and the formation of differences of adjacent brightness values. In a practical example, in a microscope image with a size of 2 megapixels, the data to be transmitted can already be reduced to an amount of the order of only 600 bytes.

The model of the brightness distribution underlying the values stored in the look-up table can vary. According to one embodiment of the invention, the stored brightness distributions in the look-up table are formed according to Gaussian distributions.

In general, the entries of the lookup table according to an embodiment of the invention can be adjusted by the user. For this purpose, according to one embodiment of the invention, the table is generated by applying a characteristic brightness distribution and calculating the associated difference values based on the brightness distribution for different offsets of the distribution and entering them as table entries at the addresses determined by the difference values.

Figure 7:
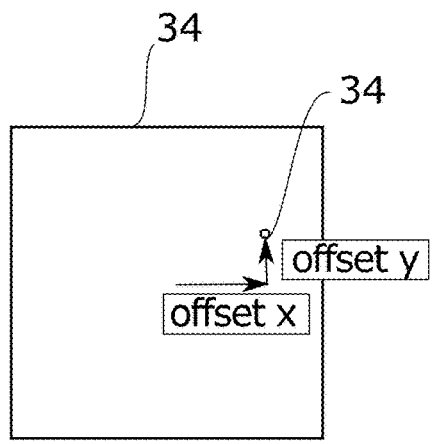
FIG. 7 shows a pixel with a location of a fluorescence event.
Figure 8:
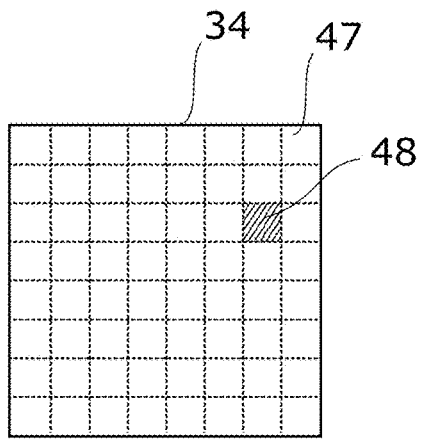
FIG. 8 shows a pixel with a sub-binning.

If the comparison of the brightness values 42 was performed with the lookup table, the location coordinates read from the lookup table are available. FIG. 7 shows as an example the area of the sample imaged by the observed pixel 34. The read out offsets in the x- and y-direction then indicate the location 45 of the fluorescence event as an offset to the center of the pixel or the corresponding area of the sample. The offset, or more generally the location coordinate can also be read out in the form of an index. The index then indicates, as shown in FIG. 8, the field position of a sub-pixel 48 associated with the fluorescence event in a grid 45 of sub-pixels.

Figure 9:
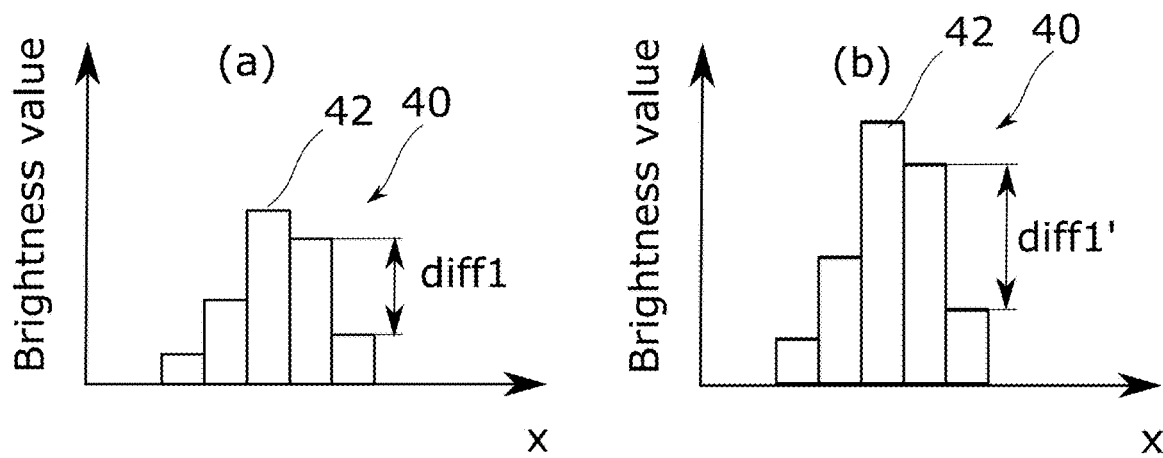
FIG. 9 shows two brightness distributions.

The determination of the coordinates based on the table can be done after subtraction without further processing. In particular, a standardization according to a further development of the invention is not necessary. The differences are in themselves dependent on the light intensity. Two fluorescence events at the same location but with different intensity lead to different differences, which differ by a brightness factor. The addresses formed by the concatenation of the differences are also different. FIG. 9 shows for clarity two brightness distributions (a), (b), which differ by the total intensity. For the sake of clarity, only one of the differences diff1, or diff1' is designated in each diagram. The brightness distributions 40 differ by the total intensity. In the example shown, all the brightnesses of the brightness distribution in the diagram (b) are higher by a factor of 1.5 than in the diagram (a). Consequently, the differences diff1'=1.5×diff1 also apply. In order to avoid a computationally expensive standardization or the calculation of ratios, a separate table entry may instead be provided for each of these cases. At first glance this may seem disadvantageous, as the table grows considerably. However, the calculation of the coordinate values is simplified and accelerated compared to a variant with standardized values. In general, without limitation to specific examples, it is therefore provided in a development of the invention that the table has a plurality of table entries with the same coordinate values for different difference values, and therefore also at different positions. These same coordinate values can then correspond in particular to brightness distributions which differ in their overall brightness.

Figure 10:
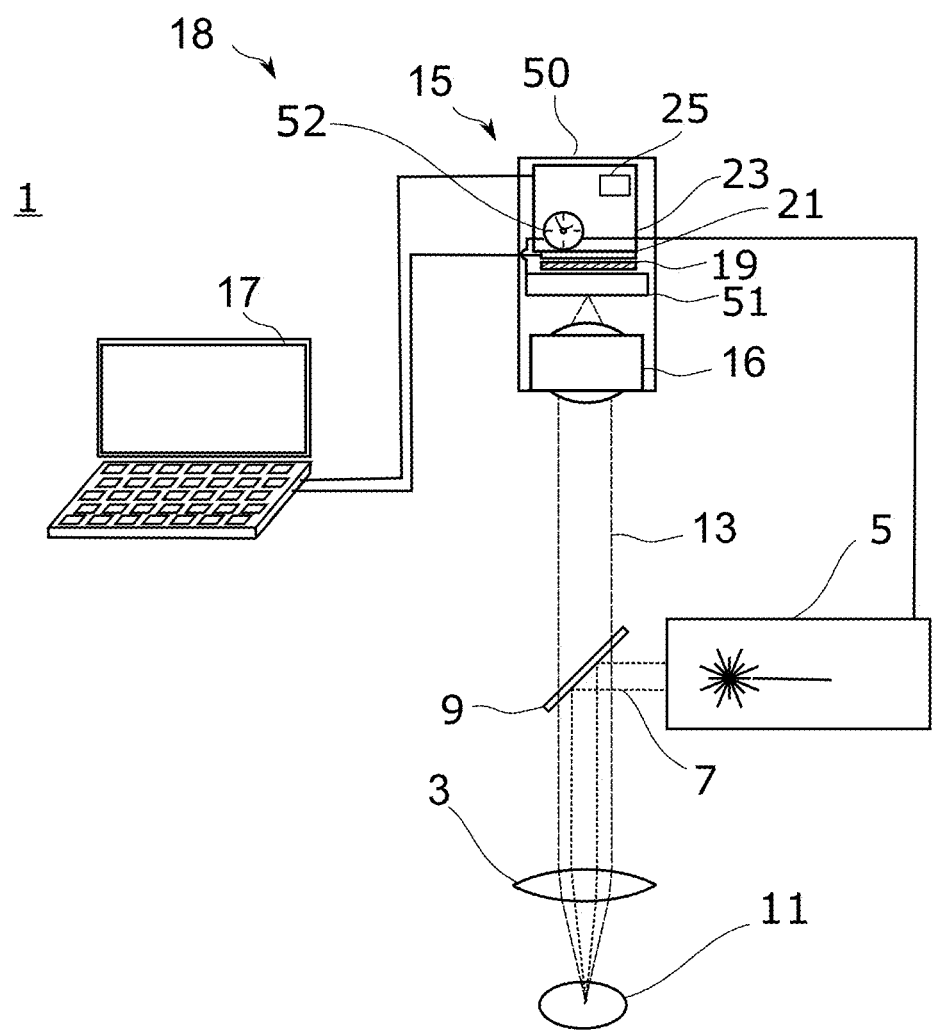
FIG. 10 shows a development of a light microscope.

According to one embodiment of the invention, it is provided to evaluate the temporal information of the fluorescence signals. An example of this is shown in the localization microscope shown in FIG. 10. The embodiment is based on the image processing apparatus 18 being generally configured to measure the time difference between a laser pulse and a fluorescence signal. For this purpose, the image processing apparatus 18 is connected to a signal line which is synchronized with the laser 5. The connection may be a trigger line for switching the laser 5 or may tap a trigger signal for the laser. Likewise, the connection may also carry a signal from a photodetector which receives the laser light. Furthermore, the camera 15 comprises an image intensifier 51. The image intensifier 51 converts the fluorescent light into an electron cascade, which is converted on a screen into an optical signal, which in turn is detected by the optoelectronic sensor 19. From the image intensifier 51, an electrical signal caused by the electron cascade can be tapped. The image processing apparatus 18 now has a time measuring apparatus 52, which measures the time difference between the two signals, that is to say the signal correlated with the light output of the laser 5 and the signal of the image intensifier 51. With such a measurement, fluorescence signals can be correlated in time with the exciting laser pulses, for example, to determine characteristic fluorescence lifetimes. Particularly preferably, the time measuring apparatus 52 is, as shown, part of the evaluation electronics 23 separate from the computer 17.

In general, without limitation to the specific illustrated example, it is provided in a further development of the invention that the image processing apparatus has a time measuring apparatus 52 which is set up to capture time differences between the times of light pulses of an excitation light source and signals of electron cascades of an image intensifier 51 in the camera 15 of the microscope 1.

The time measuring apparatus 51 may, for example, comprise a time-to-digital converter.

The time signals can then also be optionally correlated with image data, that is to say brightness maxima detected in accordance with the invention in the microscope image.

LIST OF REFERENCE NUMBERS 1 super-resolution microscope
3 lens of 1
5 laser
7 laser beam
9 dichroic mirror
11 sample
12 fluorescence emitter
13 fluorescent light
15 camera
16 objective of 15
17 computer
18 image processing apparatus
19 sensor of 15
20 pixels
21 readout electronics 23 evaluation electronics
25 microcontroller
26 radially symmetric focusing optical element
27 cylindrical lens
30 brightness distribution on 19
32 matrix of brightness values
34 relevant pixel
35 area around 34
36 first group of pixels 20
37 second group of pixels 20
38 series of pixels in x-direction
39 series of pixels in y-direction
40 brightness distribution
42 brightness value
45 location of a fluorescent event
47 sub-pixels
48 sub-pixels associated with 45
50 housing of 15
51 image intensifier
52 time measuring apparatus

The invention claimed is:

1. An image processing apparatus for image data of a super-resolution microscope, having computing means for processing the image data arranged to determine coordinates of the maxima of brightness distributions image data with an accuracy higher than the pixel pitch, the computing means being arranged to determine brightness maxima in the image data based on the increase in the brightness values of pixels relative to adjacent pixels, and wherein the image processing apparatus is further adapted to determine the coordinates of a brightness maximum by forming differences of brightness values of adjacent pixels and to concatenate these differences in sorted order according to the spatial sequence of the pixels, wherein the computing means further comprises a memory having stored therein a table with coordinate values, wherein the computing means is set up to read out a coordinate value from the table based on an address determined by the concatenated difference values.

2. The image processing apparatus according to claim 1, wherein the memory includes a two-dimensional table, the image processing apparatus being arranged to form differences of brightness values along two different directions, to concatenate the differences to an address for each direction and to read out the coordinates of the spatial directions from the table at the position determined by the two addresses.

3. The image processing apparatus according to claim 1, further comprising evaluation electronics with at least one microcontroller which is set up to perform at least the calculation of the differences of brightness values of adjacent pixels.

4. The image processing apparatus according to claim 3, further comprising a computer, wherein the evaluation electronics is integrated in a camera which is connected to the computer for transmitting the data of the evaluation electronics.

5. The image processing apparatus according to claim 3, wherein the at least one microcontroller comprises an FPGA.

6. The image processing apparatus according to claim 1, wherein the image processing apparatus is set up to compute the brightness values of a plurality of adjacent pixels in such a way that a smoothed brightness value is obtained for a pixel.

7. The image processing apparatus according to claim 3, wherein the at least one microcontroller is adapted to check the image data for fluorescence events by comparing the brightness value of an observed pixel with brightness values of several further pixels in the vicinity of the observed pixel and to then determine the position of a fluorescence emitter if the brightness value of the observed pixel is higher by a first predetermined amount than the brightness values of a first group of pixels in the vicinity of the observed pixel and if the brightness values of the first group of pixels are higher by a second predetermined amount than the brightness values of a second group of pixels, wherein the pixels are selected such that the pixels of the first group are located closer to the observed pixel than the pixels of the second group.

8. The image processing apparatus according to claim 1, wherein the table has a plurality of table entries with the same coordinate values for different difference values.

9. A super-resolution microscope comprising:
an excitation source for exciting fluorescent light in a sample to be examined with the microscope and arranged in front of a lens of the microscope,
a camera with an optoelectronic sensor for recording the microscopic image of the light emitted by fluorescence excitation from the sample, and
an image processing apparatus according to claim 1 connected to the sensor for processing image data read out from the sensor and for determining the coordinates of brightness maxima.

10. The super-resolution microscope according to claim 9, further comprising at least one astigmatically acting optical element in the beam path of the microscope, which deforms the brightness distribution on the sensor, wherein the image processing apparatus is adapted to determine the spatial coordinate of the fluorescence emitter in the axial direction of the microscope from the deformation of the brightness distribution by calculating the brightness values of several pixels.

11. The super-resolution microscope according to claim 9, wherein the image processing apparatus has a time measuring apparatus which is set up to capture time differences between the times of light pulses of an excitation light source and signals of electron cascades of an image intensifier in the camera of the microscope.

12. A method for image processing image data of a super-resolution microscope, comprising reading image data out with at least one optoelectronic sensor and determining coordinates of the maxima of brightness distributions in the image data with a computing means for processing the image data, wherein the computing means identifies brightness maxima in the image data from the brightness values of pixels relative to adjacent pixels and then determines the coordinates of a brightness maximum by forming differences of brightness values of adjacent pixels and concatenating those differences in sorted order according to the spatial sequence of the pixels, the computing means storing a table in a memory with coordinate values and reading out a coordinate value from the table based on an address determined by the concatenated difference values.

13. The method according to the claim 12, wherein the image processing apparatus calculates the brightness values of several pixels of the sensor, so that a smoothing of the brightness value of a pixel is obtained.

14. The method according to claim 13, wherein the calculation of the smoothed brightness value of a pixel comprises the addition of the brightness values of the pixels of a region having a plurality of pixels.

15. The method according to claim 14, wherein the image processing apparatus performs at least one bit shift operation when adding the brightness values of a plurality of pixels.

16. The method according to claim 12, wherein the table is generated by using a characteristic brightness distribution and the associated difference values are calculated based on the brightness distribution for different offsets of the brightness distribution, and entered as table entries at the addresses determined by the difference values.

\* \* \* \* \*